May 11, 1954    A. B. BELGARD    2,677,988
SPECTACLE FRAME PAD
Filed Jan. 10, 1952
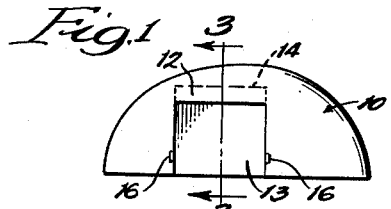
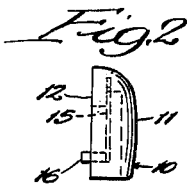
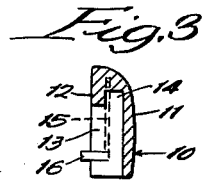
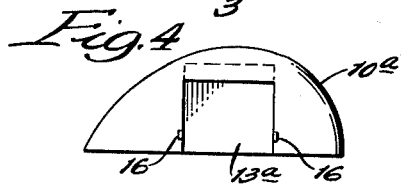
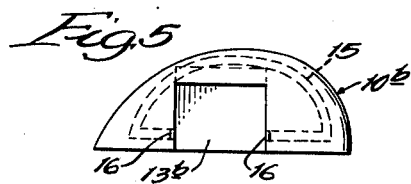
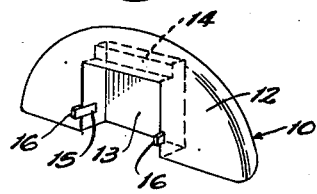
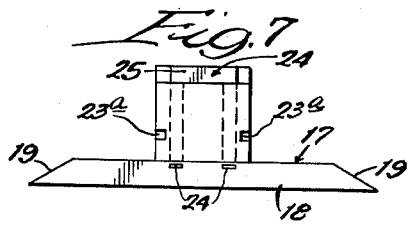
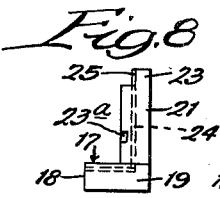
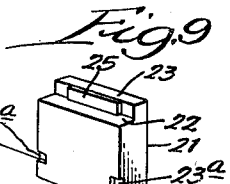
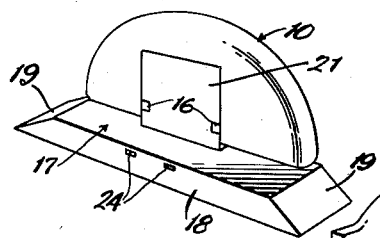
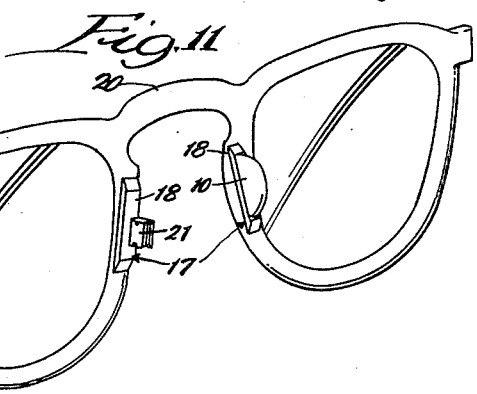
INVENTOR:
Austin B. Belgard,
BY
Dawson & Ooms,
ATTORNEYS.

Patented May 11, 1954

2,677,988

UNITED STATES PATENT OFFICE 2,677,988

SPECTACLE FRAME PAD

Austin B. Belgard, Evanston, Ill.

Application January 10, 1952, Serial No. 265,767

2 Claims. (Cl. 88—49)

This invention relates to spectacle frame pads, and more particularly to adjustable and removable pads for spectacle or eyeglass frames, and the like.

The adjustment of eyeglass frames to the nose and faces of individual wearers has long presented a problem. After an eyeglass frame which is proper for supporting lenses for the individual has been selected, there is still the problem of supporting the frame properly upon the nose of the wearer. The ordinary nose pads support the frames too high upon the nose of one wearer and too low upon the nose of another wearer. As a further complication, the pads themselves must vary in shape and thickness and position in order to support the frame properly upon one of a number of persons for whom the glasses frame must be adapted.

A further problem is presented in the measurement or trial period when the optician is attempting to find the proper pad supports for the individual wearer. With present equipment, it is extremely difficult for the optician to accurately determine the type or position of the pads required for the wearer and to a great extent hit-or-miss approximations have been attempted.

An object of the present invention is to provide pad and pad foot combinations for eyeglass frames enabling the optician to readily select the proper pads for the wearer in a minimum of time and with a high degree of accuracy, while at the same time providing a sturdy support for the pads upon the frames. A further object is to provide adjustable and removable pads for eyeglasses which permit interchangeable pads of different shapes, thicknesses and positions to be mounted upon pad feet carried by the frames. A still further object is to provide a pad foot and pad combination for mounting upon eyeglass frames, the structures cooperating to permit ready removal and adjustment of the pads and the interchange of pads having different dimensions, socket location, etc., whereby the pads may be caused to fit the nose of the wearer while at the same time producing a sturdy union between the pad and the pad foot. Yet another object is to provide in such a structure reinforcing metal elements which permit the necessary bending of the pad and pad foot while preventing undue stress or strain upon the plastic body, etc., and while also enabling the pad to be releasably secured to the foot in an extremely sturdy manner. Other specific objects and advantages will appear as the specification proceeds.

The invention is shown in an illustrative embodiment by the accompanying drawing, in which—

Figure 1 is a side view in elevation of a pad embodying my invention; Fig. 2, an end view; Fig. 3, a transverse sectional view, the section being taken as indicated at line 3—3 of Fig. 1; Fig. 4, a view similar to Fig. 1 of another form of pad in which the socket is located at a different relative position; Fig. 5, a side elevational view similar to that shown in Fig. 1 but showing a different form of pad; Fig. 6, a perspective view of the structure shown in Fig. 1; Fig. 7, a side elevational view of a pad foot which may be employed in accordance with my invention; Fig. 8, an end view of the foot; Fig. 9, a perspective view of the foot; Fig. 10, a perspective view of the foot and pad in assembled relation; and Fig. 11, a perspective view of a spectacle frame equipped with the foot and with the pad.

In the illustration given in Figs. 1, 2, 3 and 6, 10 designates a pad body which may be formed of plastic, metal, composition material, or any other suitable material. The pad has an inner surface 11 adapted to bear against the nose of the wearer and an outer surface 12. The pad is provided with a socket or recess 13, as shown more clearly in Fig. 3. Communicating with the main recess 13 is an upper recess or flange socket 14.

A metal wire 15 extends through the body of the pad, as shown best in Fig. 6, and then projects along the inner face of the cavity 13 to provide locking lugs 16.

The pad 10a shown in Fig. 4 is similar to the pad shown in Fig. 1, except that the shape of the pad and the thickness thereof is different and the cavity 13a is positioned forwardly of the cavity shown in the pad 10 of Fig. 1.

The pad 10b shown in Fig. 5 is also similar to pads 10 and 10a, except that the shape and the thickness of the pad are different and the cavity 13b is placed at a different point in the body of the pad. It will be noted that by placing the cavity at a lower point in the pad, the pad will then be in raised position when the same is secured upon a foot, while when the cavity is at a higher point in the pad body and the same is placed upon the foot, the pad will be secured in a lower position.

The pad foot 17 may be of any suitable construction. In the illustration given, the foot comprises a base portion 18 having tapered edges 19 and is adapted to be secured by cement or by fusing or other suitable means upon a spectacle frame 20, as shown more clearly in Fig. 11. Upon the base portion 18 is secured a post member 21, and I prefer to form the post 21 integrally with the base 18. In the illustration given, the post 21 is provided at its top with a notched portion 22 forming a flange 23, the flange 23 being adapted to be received within the recess 14 of the pad 19. I prefer also to provide the post 21 near its lower front side with locking notches 23a adapted to receive the locking lugs 16 of pad 10.

The pad foot 17 is reinforced throughout its base portion 18 and post portion 21 with an inverted U-shaped metal member 24. The bridge portion 25 of the U-shaped member 24 extends into the notched portion 22 of the post 21, as shown more clearly in Figs. 7, 8 and 9, and when the flange 21 and metal bridge 25 are pressed upwardly within the recess 14 of the pad 10, a tight, sturdy fit is brought about for securing the pad firmly upon the post.

I have found that the pad foot 17 can be formed very effectively by casting the post 21 and base 18 in a flat sheet body with the reinforcing wire 24 therein and then bending the post portion 21 to produce the structure illustrated in Fig. 9. The pre-bent pad foot establishes "grain direction" of the plastic, and further precludes any undue stress or strain occasioned by minor adjustment bending.

The reinforcement of both pad and foot pad with flat metal wire laminated or molded therein permits the necessary bending of the pad or pad foot with a minimum tendency to weaken or crack or break off the plastic material from articulations.

It will be understood that the pads 10, 10a and 10b are merely examples of a large number of pads which may be provided, and these pads may vary in shape, contour, dimensions, and particularly with respect to the location of the sockets therein. By shape variations of the pads in producing the high, neutral and low positions, maximum strength is provided at the points where routing is close to the curved edge. It will be understood that the shape of the foot base and post may be likewise varied widely, it being merely necessary that the post be shaped for interlock with pads having different cavity locations therein for thus raising and lowering the pads relative to the pad foot and thus properly setting the pads upon the nose of the wearer. It will further be understood that the pad foot may, if desired, be formed integrally with the spectacle frame or the feet may be formed separately and secured by cement or other means to the spectacle frame at the time of fabrication of the frame or at any later desired stage.

Operation

In the operation of the structure, the glasses frame 20 is equipped with feet 17, as illustrated in Fig. 10 by a pre-molding operation, cementing, fusing, or by any other desired procedure.

When the eyeglass frame has been selected for the patient and it is desired to fit the glasses frame to the nose of the patient, the optician or technician selects pads in which, for example, the socket may be in a relatively high position, and secures the pads readily upon the posts so that the frame thus equipped with pads may be tested upon the patient's nose. If the fit is not satisfactory, the pads are removed and a pad having the socket thereof in a neutral or low position may be employed. Further, pads of different shapes and thicknesses may be similarly tested. By thus trying out pads of different sizes, shapes and elevations, the technician soon finds pads which meet the requirements of the wearer's nose and support the selected glasses frame accurately upon the wearer's nose. At that time, the locking lugs 16 are turned inwardly and pressed within the locking recesses 23a of the post 21. The engagement of the post 21 with the socket portion 13 of the pad, the interlocking of the flange 23 with the socket or recess 14 of the pad, and the clamping of the locking lugs 16 within the recesses 23a of the post, result in an extremely sturdy union between the pad and the post.

Should the patient, after wearing the glasses for some time, find that the pads are uncomfortable or wish some change in the support for the glasses, the technician can readily straighten the lugs 16, remove the pads 10, and substitute new pads to meet the requirements of the patient.

While, in the foregoing specification, I have set forth specific structures in considerable detail for the purpose of illustrating embodiments of the invention, it will be understood that such details of structure may be varied widely by those skilled in the art without departing from the spirit of my invention.

I claim:

1. A foot and pad combination for eyeglass frames, comprising a foot adapted to be secured to the eyeglass frame and having a rearwardly-extending post, said post being provided with a locking flange extending upwardly above one portion of the top of the post and having also at its forward sides locking indentations, and a pad having a recess adapted to receive said post and a supplemental recess communicating with said first-mentioned recess for receiving said flange, said pad having also a reinforcing metal strap extending through the sides of said pad and engageable with the recesses of said posts for locking said pad upon said posts.

2. In combination with a plastic eyeglass frame, a pad foot carried by the frame and having a rearwardly-extending post, said post having at its forward sides locking indentations, a metal wire extending through said post and pad foot to unite the same, and a pad having a recess adapted to receive said post, said pad having a reinforcing metal strap extending through the sides of said pad and engageable with the indentations of said posts for locking said pad upon said posts.

References Cited in the file of this patent

UNITED STATES PATENTS

| Number | Name | Date |
|---|---|---|
| 1,867,865 | Nelson | July 19, 1932 |
| 2,035,785 | Bouchard | Mar. 31, 1936 |
| 2,267,997 | Spray | Dec. 30, 1941 |

FOREIGN PATENTS

| Number | Country | Date |
|---|---|---|
| 312,749 | Great Britain | June 6, 1929 |
| 518,938 | Great Britain | Mar. 12, 1940 |